April 7, 1959    R. L. MARR    2,880,548
QUAIL CALLING WHISTLE
Filed Aug. 23, 1957

Robert L. Marr
INVENTOR.

United States Patent Office 2,880,548
Patented Apr. 7, 1959

2,880,548

QUAIL CALLING WHISTLE

Robert L. Marr, Blackshear, Ga.

Application August 23, 1957, Serial No. 679,875

1 Claim. (Cl. 46—179)

The present invention relates to certain new and useful improvements in a whistle and while the construction is such that a variety of sounds may be produced thereon, it is primarily constructed and intended for use by quail hunters.

In carrying out the invention an endless annular rim or body member is provided with a pair of hollow conical ends or members having truncated end portions projecting into the chamber provided, whereby to thus provide a unique instrument which has proved, when used out in the woods, to accurately reproduce the call or cry of a quail to thus attract quails and to actually cause them to answer and to thus enable the hunter to carry out his expedition and quail hunt to an appreciable degree of success.

Stated somewhat more explicitly, the concept has to do with a simple, practical and expedient tin or an equivalent whistle which is light in weight, durable and such in construction and design that a user thereof, usually a hunter, will be able to draw or pull air currents through the registering truncated openings and, while at the same time, making the sound of a quail, can accurately reproduce the call of the quail to attract attention for helpful hunting needs.

Other objects, features and advantages will become more readily apparent from the following description and the accompanying drawing.

In the drawing, wherein like numerals are employed to designate like parts throughout the views.

Figure 1:
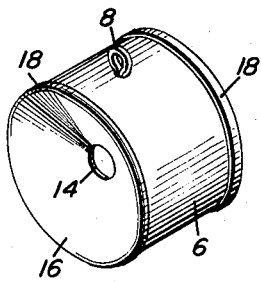
Fig. 1 is a perspective view of a whistle constructed in accordance with the principles of the present invention.
Figure 2:
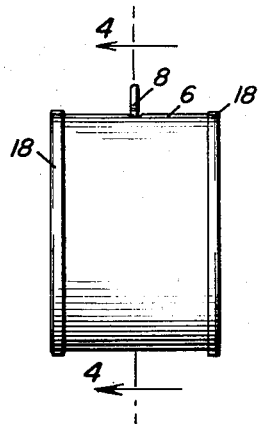
Fig. 2 is a side elevation of the same.
Figure 3:
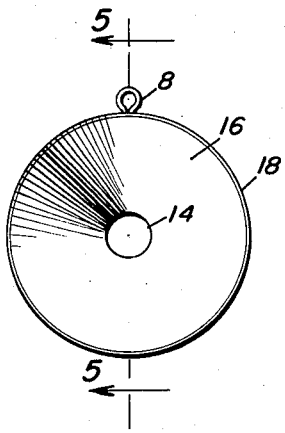
Fig. 3 is a front elevation.
Figure 4:
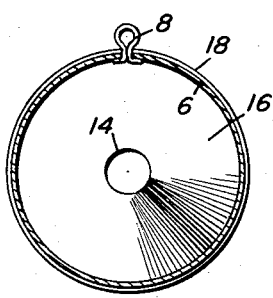
Fig. 4 is a section on the vertical line 4—4 of Fig. 2, looking in the direction of the arrows.
Figure 5:
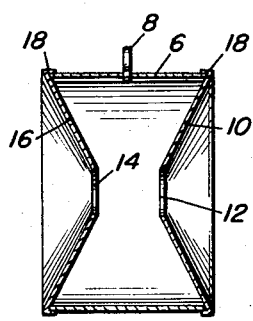
Fig. 5 is a section on the vertical line 5—5 of Fig. 3.

The invention is characterized by a compact one-piece construction which is actually made of three components properly secured together. The body portion comprises an annular wall or rim which may be called an annulus 6. This rim is provided at a desired place with a fixedly mounted eye 8 to accommodate a chain or the like by way of which the complete whistle may be fastened around a hunter's neck. The body portion or member is of uniform cross-section from one end to the other end. I provide a pair of opposed identical hollow conical members 10 (at the right) and 16 (at the left) as shown especially in Fig. 5. The outer peripheral edges of the conical members have endless flanges 18 overlapping and embracing the marginal peripheral portions of the rim 6. These flanges are connected air-tight to cooperating ends of the rim. The several thus connected rim and conical members cooperate with each other and provide a hollow chamber. It will be noticed that the width of the rim is greater than the combined depth of the conical members 10 and 16. Also, the apical portions 12 and 14 are truncated and provide a pair of restricted openings. These openings register in alignment with each other and they are confined wholly within the encircling or surrounding limits of the space enclosed or encompassed by the rim 6.

It will be evident from the drawings that the gauge of the sheet metal, particularly of the truncated cones, is extremely thin and the marginal edges around the holes 12 are likewise thin for good effect. Experimental models have been made in different sizes and on the requirements of a graduated scale and it is possible in so doing to enable the whistle to give out different tones when blown by the hunter. The conical members 10 and 16 may be slightly more concave than tapered and in any event the whistle provides a hollow chamber defined by the annulus and the conical members attached thereto and opposed to each other and constitutes a highly simple and an effective whistle construction. One may say that the "secret" of obtaining the desired quail-like effect is evolved and worked out by practice and patience. If the hunter, as is usually the case, has a fair idea of the common call of the quail (the North American quail commonly known as a bobwhite) he draws or sucks the air from the outside diaphragm through the inside one and at the same time makes an accompanying sound with the mouth in a near resemblance of his idea of the bobwhite's call, resulting in truly effective resultfulness and often bringing about an amazing response and answer from near-by quail.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A hunter's whistle by way of which a hunter having requisite training and skill may imitate the call of a quail comprising a three-part whistle embodying: an endless annular imperforate sheet material rim constituting a body member and being of uniform cross-section from one end to the other end, and a pair of opposed identical hollow conical members, the outer peripheral edges of said conical members having endless flanges overlapping and embracing the marginal peripheral portions of said rim and being connected airtight to the respective cooperating ends of said rim, the several thus connected rim and conical members cooperating in providing a hollow chamber, the width of said rim being appreciably greater than the combined depth of the conical members and the apical portions of said members being truncated and providing restricted openings in registering alignment with each other and said apical portions being wholly confined within the limits of the space encompassed by said rim.

References Cited in the file of this patent

UNITED STATES PATENTS

| 303,139 | Farnham | Aug. 5, 1884 |
| 1,306,662 | Geer | June 10, 1919 |
| 2,106,097 | Homan | Jan. 18, 1938 |
| 2,519,324 | Smith | Aug. 15, 1950 |

FOREIGN PATENTS

| 25,624 | France | Jan. 17, 1923 |